US012438378B2

(12) United States Patent
Grasböck et al.

(10) Patent No.: US 12,438,378 B2
(45) Date of Patent: Oct. 7, 2025

(54) CONTROLLING A SOLAR POWER PLANT

(71) Applicant: Fronius International GmbH, Pettenbach (AT)

(72) Inventors: Richard Grasböck, Wels-Thalheim (AT); Johannes Graf, Wels-Thalheim (AT); Stefan Wieser, Wels-Thalheim (AT); Christian Fasthuber, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 18/730,520

(22) PCT Filed: Jan. 26, 2023

(86) PCT No.: PCT/EP2023/051858
§ 371 (c)(1),
(2) Date: Jul. 19, 2024

(87) PCT Pub. No.: WO2023/144239
PCT Pub. Date: Aug. 3, 2023

(65) Prior Publication Data
US 2025/0141233 A1 May 1, 2025

(30) Foreign Application Priority Data
Jan. 28, 2022 (EP) .................................... 22153880

(51) Int. Cl.
*H02J 3/38* (2006.01)
*G05F 1/67* (2006.01)

(52) U.S. Cl.
CPC ................ *H02J 3/381* (2013.01); *G05F 1/67* (2013.01); *H02J 2300/26* (2020.01)

(58) Field of Classification Search
CPC .......... H02J 3/38; H02J 3/381; H02J 2300/26; G05F 1/67
See application file for complete search history.

(56) References Cited

U.S. PATENT DOCUMENTS

2018/0269688 A1 9/2018 Bettenwort et al.

FOREIGN PATENT DOCUMENTS

DE 10 2014 003 816 9/2015

OTHER PUBLICATIONS

Int'l Search Report (SR) (form PCT/ISA/210) conducting in Int'l Appln. No. PCT/EP2023/051858 (Feb. 15, 2023).
(Continued)

*Primary Examiner* — Robert L Deberadinis
(74) *Attorney, Agent, or Firm* — GREENBLUM & BERNSTEIN, P.L.C.

(57) ABSTRACT

Method for optimizing a maximum power point of a solar cell stack having modules, each including an MLSD unit, and an inverter. The MLSD unit shuts down the module when module voltage falls below a first voltage threshold, and switches it on, when a predefined second voltage threshold is exceeded. For optimal performance, the solar cell stack carries out: Defining, changing an electrical control parameter to a first wait value so that the second voltage threshold is exceeded exceeded; maintaining first wait value for a first time period so the modules are switched on by the MLSD units; changing electrical control parameter to a threshold value in a variation range and determining current-voltage curves for the modules in variation range; determining maximum stack power from current-voltage curves of the modules in the variation range; and predefining the determined maximum stack power as the maximum performance point.

14 Claims, 5 Drawing Sheets

(56) References Cited

OTHER PUBLICATIONS

Figure 1A:
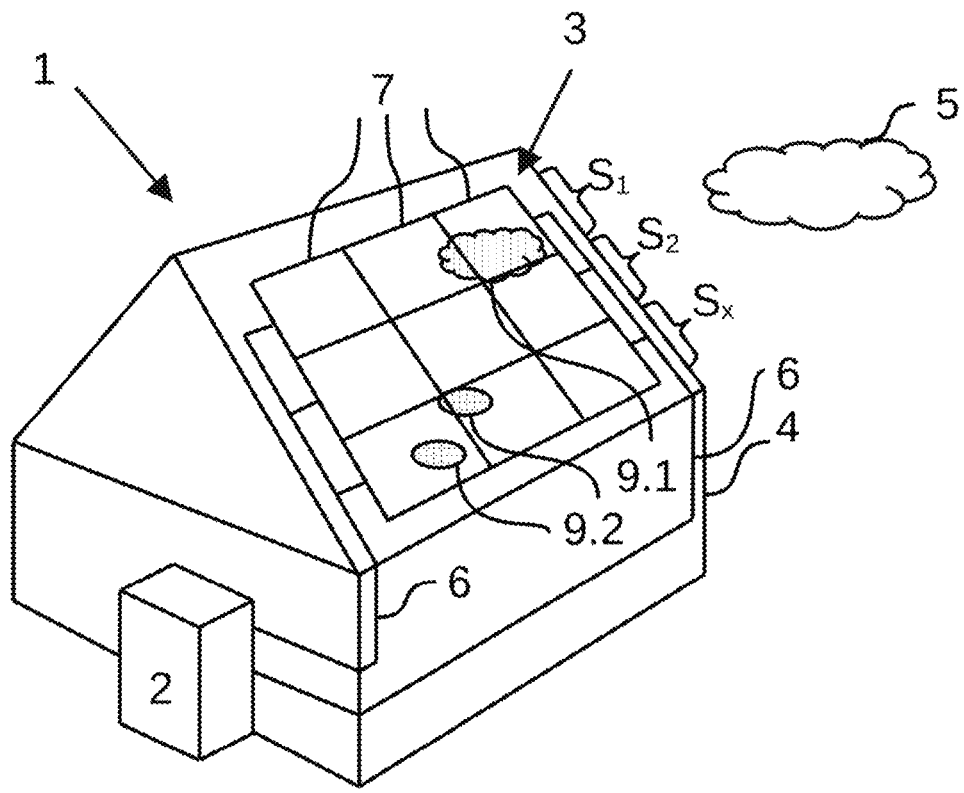

Int'l Written Opinion (WO) (form PCT/ISA/237) conducting in Int'l Appln. No. PCT/EP2023/051858 (Feb. 15, 2023).

Fig. 4 (SdT)

CONTROLLING A SOLAR POWER PLANT

The present invention relates to a method and an apparatus for optimizing a maximum power point of a solar cell stack, comprising a plurality of modules and an inverter, wherein each module of the plurality of modules comprises an MLSD unit which shuts down the connected module as soon as a module voltage of the respective module falls below a first module voltage threshold value and switches the connected module on, when a predefined second module voltage threshold value is exceeded.

As a rule, large-scale solar plants comprise a plurality of so-called solar cell stacks, which have a large number, often sixteen to eighteen, of modules in series. The modules are often arranged in strings, wherein each solar cell stack is connected to an input of an inverter. Each module itself has a large number of individual cells, wherein one module can currently comprise around one hundred individual cells. Such solar cell stacks can generate direct voltages of up to 1000 V (direct current), with several amperes of current. Each string supplies a DC voltage of 1000 V. Depending on the current requirement, a plurality of parallel strings is connected together. If there is a high power requirement, it may also be possible to operate a plurality of solar cell stacks in parallel. Such solar plants can be optimized on a power-electronic basis by optimizing the output of a solar plant as a function of the weather conditions and time of day and setting a maximum power point (MPP) of the solar cell stack.

A distinction is made between two mechanisms. Firstly, there is a so-called MPP scan, which analyzes a current-voltage curve of each module between the open-circuit voltage (current is zero) and the open-circuit current (voltage is zero). These current-voltage curves are known to have a non-linear course, which can vary from module to module. The differences are caused, for example, by different production conditions, for example due to grid faults or mechanical defects, along with soiling or shading during operation. The maximum power point is set as a function of all the current-voltage curves determined for the modules in the solar cell stack. Since power production is interrupted during an MPP scan, it is desirable to carry out such MPP scans as rapidly as possible, on the one hand, and as infrequently as possible, on the other hand, i.e., with the longest possible time intervals between individual MPP scans. For example, an individual MPP scan can take a few seconds and can be carried out approximately every ten minutes.

Secondly, a so-called MPP tracker is used to optimize the power between the individual MPP scans. This MPP tracker changes the current or voltage only minimally by a control parameter range around the maximum power point specified by the MPP scan, thus guaranteeing optimized power of the entire solar cell stack.

Today's solar cell stacks use so-called "module level shutdown (MLSD)" units, which are supplied with the necessary energy by the solar cell stack itself. MLSD units satisfy a safety need for solar cell stacks that operate at high DC voltages and powers, and are used to bring the solar cell stacks into a safe operating state. For example, the high voltages of the solar cell stacks can be a source of danger to people when extinguishing a fire in a solar plant.

MLSD unit-based shutdowns have generally a hysteresis. At minimum voltages of 8 VDC (DC voltage), for example, the MLSD unit automatically shuts down the corresponding module and only starts it up again at slightly higher voltages, such as 10 VDC. Furthermore, the inverter, which usually also carries out control functions in a solar cell stack, injects a regular signal, the so-called "power-line-communication (PLC)" signal, to power up deactivated modules again when the upper limit voltage, in the above example 10 VDC, is exceeded. Since the interval of this signal is in the range of seconds, it can also lead to time effects (such as delays) upon start-up after an MLSD unit-based shutdown, in addition to voltage hysteresis, if the MPP scan is not synchronized with the PLC signal.

MPP scans in the prior art vary either current or voltage in the solar cell stack and can thus scan different current-voltage values. Due to differences in the modules themselves and due to soiling and shading, it may happen that at nominally the same current value, especially near the open-circuit current, some modules have high voltages, while other modules have fallen below the minimum voltage of the MLSD unit-based shutdown, and thus the MLSD unit shuts down the respective module(s). Thus, it can happen that the MPP scan only finds a power below the maximum instead of a maximum power (since some modules shut down) and therefore the solar cell stack is not operated at the maximum power point (MPP). If the current on the solar cell stack is too high for individual modules, such that not enough voltage can build up, then these modules remain deactivated, wherein the modules remain inactive at least until the next MPP scan.

Therefore, it is the object of the invention to provide a solar cell stack with an MLSD unit and a method for operating such a solar cell stack, with which the solar cell stack can be operated at the optimum possible maximum power point regardless of the environmental conditions.

The object is achieved according to the invention with the features of the independent claims 1 and 11. As a result, all available modules are always switched on by the respective MLSD unit while the maximum power point is being determined. This ensures that the actual maximum power of the solar cell stack is determined and predefined to the solar cell stack as the maximum power point. Therefore, it is possible to prevent a lower power from being incorrectly determined and predefined as the maximum power point due to any modules that are shut down.

In an advantageous embodiment, the following steps can also be carried out after the maximum power point has been determined: Changing the electrical control parameter to a predefined second wait value with the inverter, wherein the second wait value is established such that the second module voltage threshold value of the plurality of modules is exceeded; and maintaining the electrical control parameter at the second wait value for a predefined second time period, such that the plurality of modules are switched on by the MLSD units. This is advantageous, because it ensures that all modules are switched on again by the MLSD unit when the second wait value is applied. Thus, the solar cell stack can be put back into operation immediately with all active modules after the determination of the maximum power point.

In a further advantageous embodiment, a stack current can be used as the electrical control parameter, wherein an established stack current target value is used as the first wait value and the stack current target value is increased from the first wait value to the parameter threshold value. Thus, a current value can be predefined for the solar cell stack, on the basis of which the voltage is set.

In a further embodiment, a stack voltage can be used as the electrical control parameter, wherein an established stack voltage target value is used as the first wait value and the stack voltage is reduced from the first wait value to the parameter threshold value. Thus, the exact value of the first and second module voltage threshold values can be set.

In a further advantageous embodiment, a different electrical control parameter can be used in the second time period than in the first time period. Thus, for example, it is possible to switch between current and voltage as electrical parameters in the method according to the invention. This is advantageous, for example, to set the second module voltage threshold value via the voltage as the electrical control parameter.

In a further advantageous embodiment, the first time period can be defined via a predefined time period or as a function of a PLC signal transmitted from the inverter to the MLSD units or by the point in time, at which a module in the solar cell stack is switched on, and/or the second time period can be defined via a predefined time period or as a function of a PLC signal transmitted from the inverter to the MLSD units. Thus, the first and/or second time period can be set as short as possible. This is advantageous because it means that the entire method according to the invention can be shortened and thus the solar cell stack can resume operation as rapidly as possible at the new maximum power point.

In a further advantageous embodiment, the first time period and the second time period can be of equal length. Thus, the first and second time periods can be controlled by the same predefined time duration and/or a PLC signal. Thus, the method according to the invention can be further simplified and shortened.

In a further advantageous embodiment, the parameter threshold value can be established as a function of a predefined fixed value or a reference value. Thus, it is ensured that the maximum power point is found at a peak and that the solar cell stack is operated effectively.

In a further advantageous embodiment, a value that is 30-60% of the stack voltage from a range prior to the MPP scan, preferably 50%, can be used as the reference value of the parameter threshold value. This is advantageous, because it refers to a maximum power point defined in the previous MPP scan, which is used for control in the range prior to the MPP scan. Thus, a new maximum power point can be found even more effectively.

In a further advantageous embodiment, an MPP tracking can be carried out after the determination of the maximum power point, in which the determined maximum power point is changed within a defined control parameter range, wherein the control parameter range preferably is ±10% of the determined maximum power point. Consequently, the MPP tracking can only cause small shifts in the electrical control parameter to be able to react to changes in the solar cell stack during operation. In contrast to the MPP scan, MPP tracking does not interrupt power production and can therefore be advantageous for fine adjustments of the maximum power point.

In a further advantageous embodiment, the inverter can comprise a control unit, wherein the inverter is designed to transmit a PLC signal to the solar cell stack. The PLC signal is used to switch on and shut down the modules in the solar cell stack and can be linked to the first and second time periods. Thus, the PLC signal transmitted at regular points in time can end the first and second time periods, for example after a predefined number of signals.

In a further advantageous embodiment, a maximum power point can be predefined for a plurality of solar cell stacks via the inverter. The inverter can have a number of inputs and each input is connected to a solar cell stack. Thus, the method according to the invention can be carried out on a plurality of solar cell stacks simultaneously. Depending on the status, each solar cell stack is then assigned a maximum power point.

In a further advantageous embodiment, the solar cell stack can have a number of strings connected in parallel, wherein each string has a number of modules connected in series. Thus, the solar cell stack can be adjusted to a power requirement by adjusting the strings in the solar cell stack.

Figure 1B:
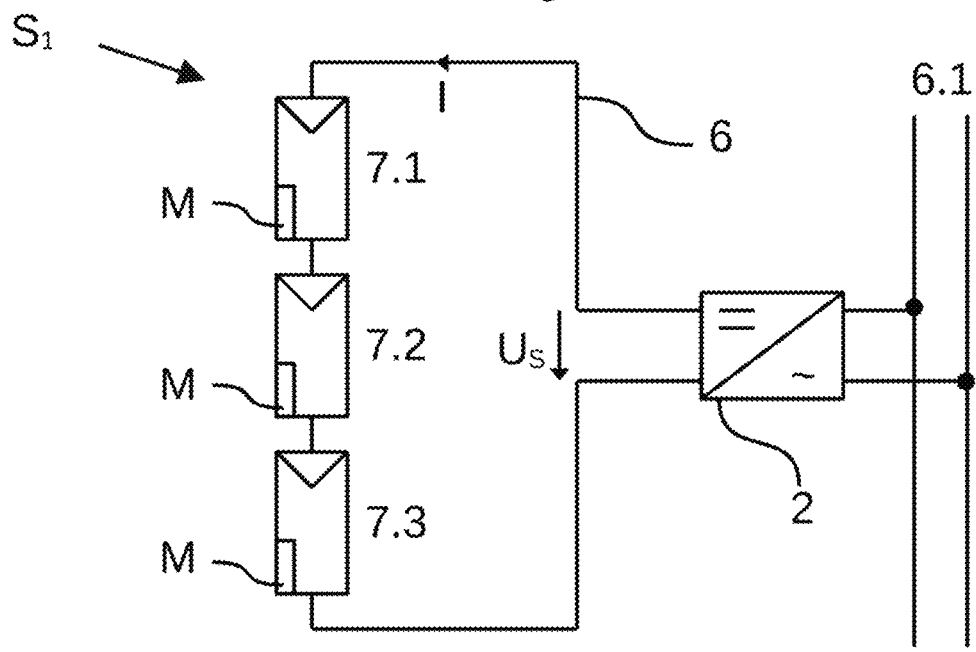
Figure 2:
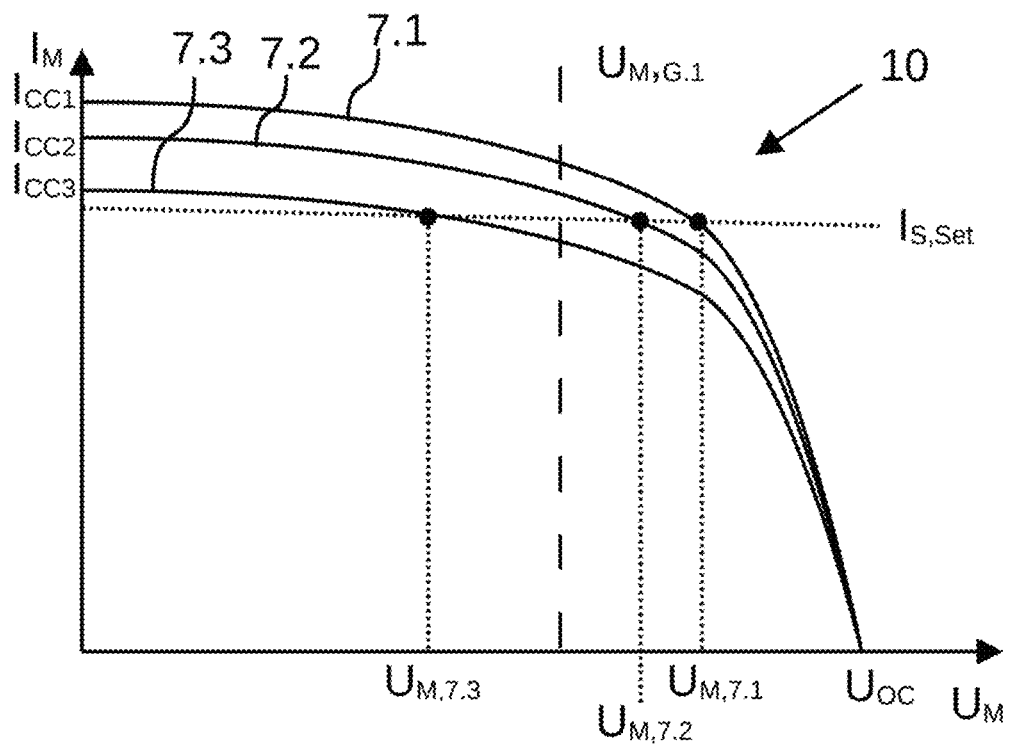
Figure 3:
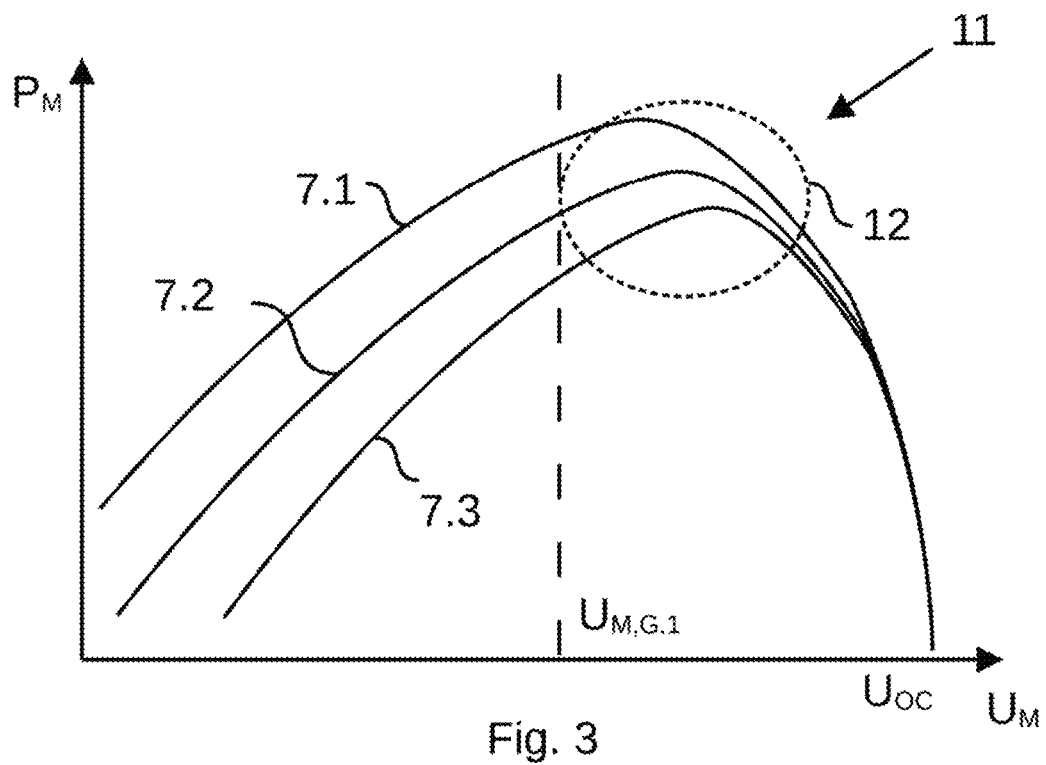
Figure 4:
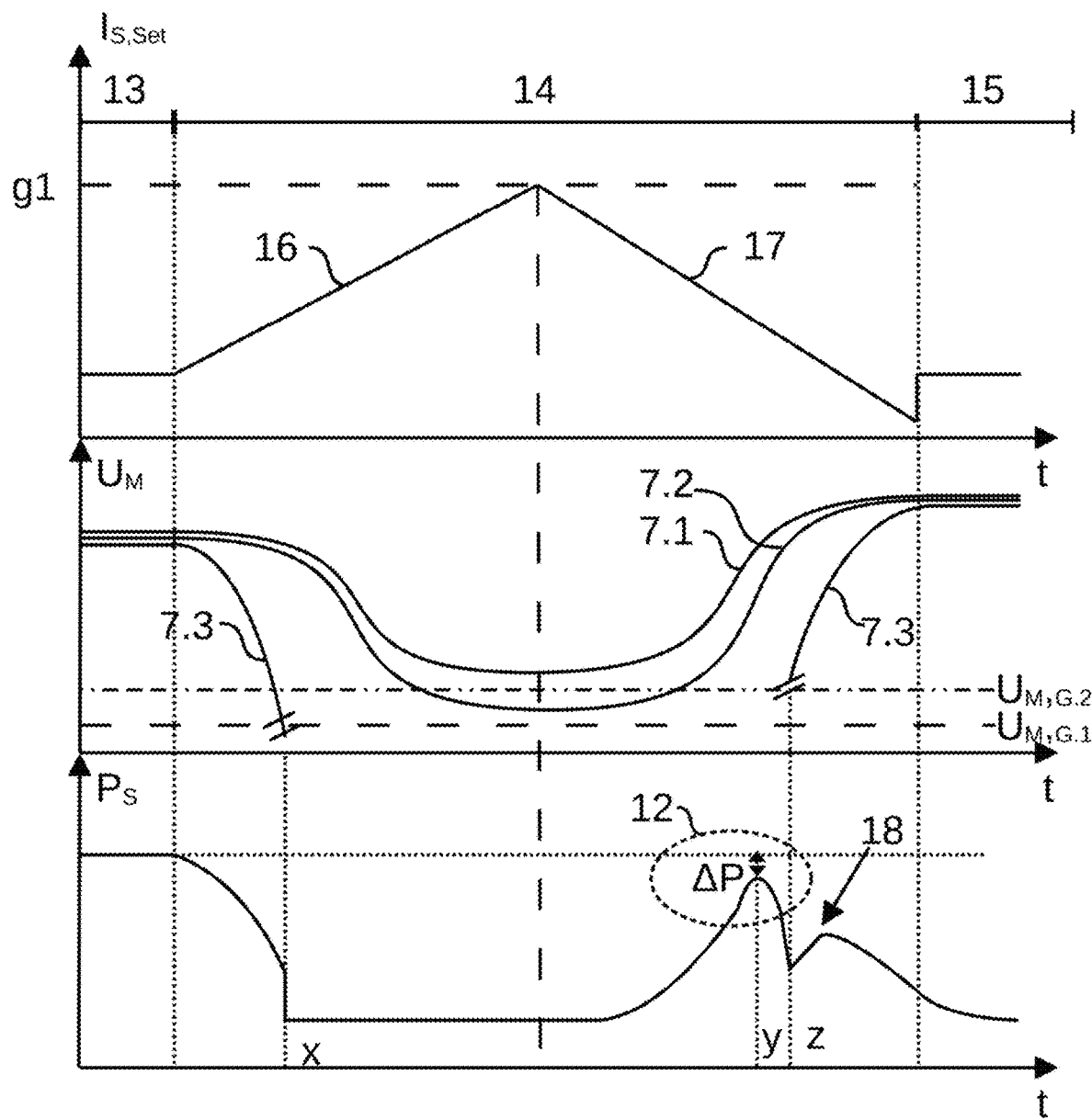
Figure 5:
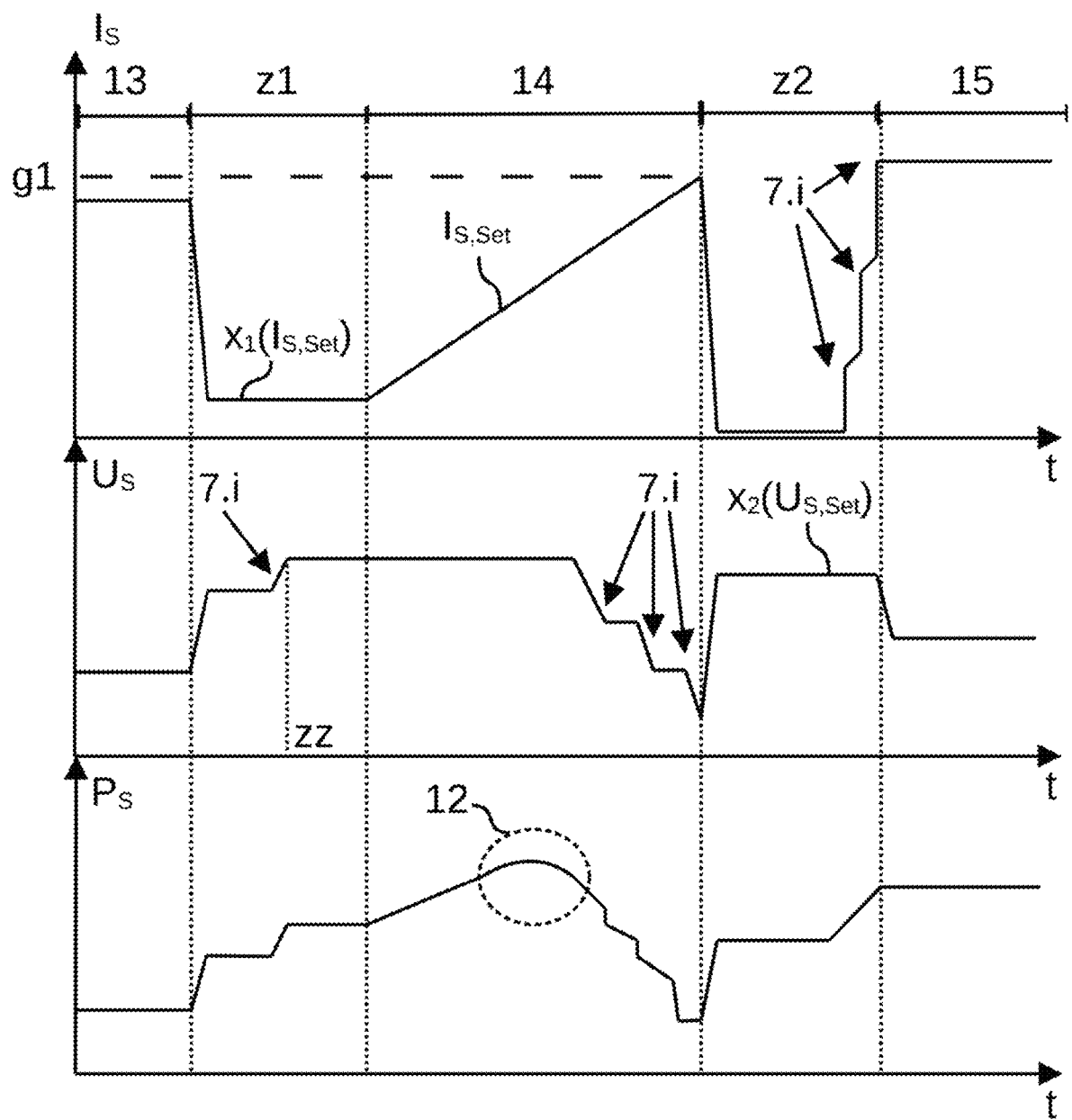
Figure 6:
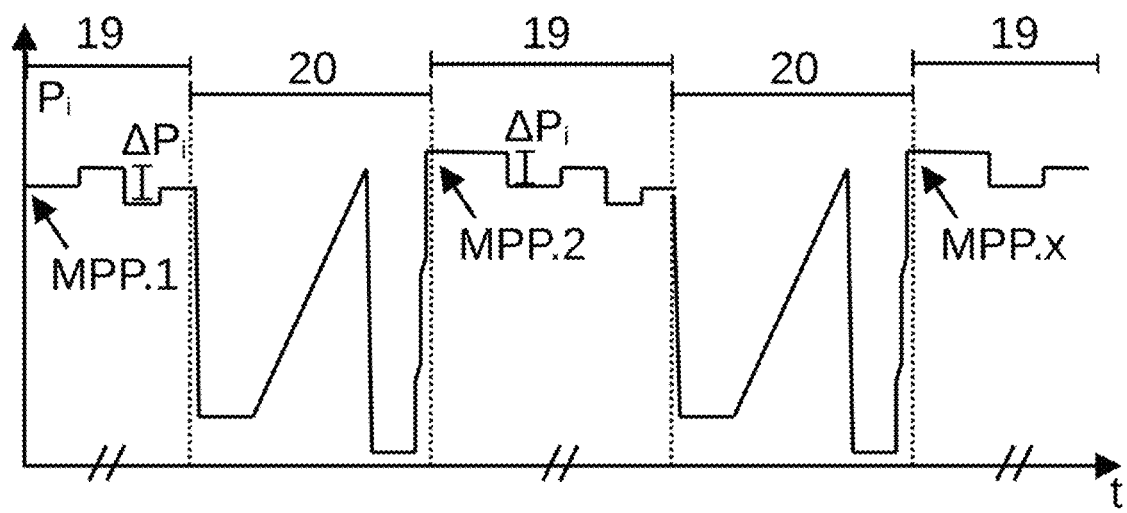

The present invention is explained in more detail below with reference to FIGS. 1 to 6, which show exemplary, schematic and non-limiting advantageous embodiments of the invention. In the figures:

FIG. 1*a* shows a schematic solar power plant,

FIG. 1*b* shows a circuit of a string with a plurality of modules,

FIG. 2 shows various exemplary current-voltage curves of individual modules of the solar cell stack, FIG. 3 shows various exemplary power-voltage curves of individual modules, FIG. 4 shows an exemplary MPP scan from the prior art, FIG. 5 shows an MPP scan according to the invention in a preferred embodiment, and FIG. 6 shows a combination of MPP scan and MPP tracker for optimizing a maximum power point of a solar cell stack.

FIG. 1*a* shows a schematic solar power plant 1 with a solar cell stack 3, which has a plurality of strings $S_1, S_2, S_x$. FIG. 1*b* shows a corresponding block diagram of a string $S_1$ of the solar cell stack 3 of the solar power plant 1. In FIG. 1*a*, the solar cell stack 3 is mounted on the roof of a building 4, for example a private house, a warehouse or a production plant. A solar cell stack 3 comprises a plurality of modules 7.*i*, which can be connected in series to form at least one string S. A plurality of strings S can also be provided, which can be connected in parallel, for example. An inverter 2 is also provided in the solar power plant 1, which is connected to the parallel-connected strings $S_1, S_2, S_x$ via electrical cables 6. The modules 7 each comprise an MLSD unit M, which is shown in FIG. 1*b*. The solar cell stack 3, or the respective strings $S_1, S_2, \ldots, S_x$ of the solar cell stack 3, are connected to the inverter 2, wherein the latter is connected with at least two poles via the lines 6. As a rule, each solar cell stack 3 has a separate input on the inverter 2. Thus, one inverter 2 can also operate a plurality of solar cell stacks 3.

Depending on the time of day and weather conditions, the solar cell stack 3 delivers a different stack power $P_S$. A shading 9.1 or soiling 9.2 of the solar cell stack 3 is shown by way of example in FIG. 1*a*. Shading 9.1 can occur, for example, due to cloud cover, as shown by a cloud 5 in FIG. 1*a*. However, shading 9.1 can also be caused by vegetation, such as trees, or by other buildings during the course of the day. It is also possible that parts of a module 7 are soiled, as shown for example by soiled areas 9.2 in FIG. 1*a*. The soiling can be of natural origin, for example, such as plant parts or animal excrement, but anthropogenic soiling such as fine dust, soot particles and the like can also be responsible for soiled areas 9.2.

FIG. 1*b* shows a string $S_1$ of a solar cell stack 3 with three modules 7.1, 7.2, 7.3. As mentioned above, the modules 7.1, 7.2 and 7.3 in each case contain an MLSD unit M, which is installed for the safety-related shutdown of the assigned module 7 and whose function is explained in more detail below. However, a string S does not necessarily have only three modules 7, but can contain a number of modules 7 that is necessary for the application of the solar cell stack 3. It is also possible that a solar cell stack 3 only consists of an individual string S. Of course, this can be a function of the required nominal voltage and the required nominal current of the solar cell stack 3. For example, a further string $S_2$ with three more modules 7 could be connected in parallel to the first string $S_1$. The stack voltage $U_S$ is accordingly the same for all strings, the supplied current can be different for each string S and the sum of the individual currents of the strings S then flows at the input of the inverter 2 and results in a stack current $I_S$. The inverter 2 can be connected to a local grid or to the general power grid 6.1. Thus, the stack current $I_S$ produced can be supplied to the building 4 itself, for example, and fed to consumers, or fed into the general power grid 6.1. In FIG. 1a, only one input of the inverter 2 is shown as an example. Of course, an inverter 2 can also have a plurality of inputs.

Accordingly, a stack voltage $U_S$, which corresponds to the sum of the module voltages $U_M$ (not shown in FIG. 1b) of the series-connected modules 7, is applied to the inverter 2. The more modules 7.i present in parallel (also in the form of parallel strings S), the higher the nominal current produced by solar power plant 1.

The inverter 2 comprises a control unit (not shown), which can be implemented, for example, as microprocessor-based hardware, such as a computer, microcontroller, digital signal processor (DSP), programmable logic controller (PLC), etc., on which corresponding control programs run to implement the respective function. A design as an integrated circuit, such as an application-specific integrated circuit (ASCI) or field programmable gate array (FPGA), is also possible. The direct current produced by the solar cell stack 3 is converted into alternating current by the inverter 2. For each input of inverter 2 (i.e., for each solar cell stack 3), a so-called maximum power point (MPP) is carried out, such that a maximum stack power $P_S$ can be produced. The determination of the maximum stack power $P_S$ is determined by MPP tracking 19, which is explained in more detail later.

The soiling 9.1 and shading 9.2 result in individual modules 7.i not functioning or only functioning to a limited extent and thus have an effect on the photovoltaically produced stack voltage $U_s$ and the stack current $I_S$ of the solar cell stack 3. In addition to production-related differences in the modules 7.i, all the effects described above have an impact on the current-voltage curves 10 of the individual modules 7.1, 7.2, 7.3 shown in FIG. 2, for example. The MPP control has the object of finding the point of maximum power—the maximum power point MPP—of a solar cell stack 3. Advantageously, the respective maximum power point MPP can also be found in parallel for a plurality of solar cell stacks 3 in a solar power plant 1. This is done during an MPP scan.

FIG. 2 shows the current-voltage curves 10 of the modules 7.1, 7.2, 7.3 of the string $S_1$ of the solar cell stack 3. The module voltage $U_M$ is plotted on the abscissa, while the module current $I_M$ is plotted on the ordinate. For power generation applications in photovoltaics, only the first quadrant of the Cartesian coordinate system of the current-voltage curve 10 is of interest and is therefore recorded by MPP scans. At a module voltage $U_M=0$, each module 7.1, 7.2, 7.3 has a closed-circuit current $ICC_1$, $ICC_2$, $ICC_3$ (closed-circuit current=$I_{cc}$) and at a module current $I_M=0$, each module has an open circuit voltage $U_{OC1}$-$U_{OC3}$ (only shown as open-circuit voltage=$U_{oc}$ in FIGS. 2 and 3).

FIG. 2 shows the current-voltage curves 10 of the first module 7.1, the second module 7.2 and the third module 7.3. Advantageously, these can be the three modules of the string $S_1$, as shown in FIG. 1b. Here, the string $S_1$ can also represent the entire solar cell stack 3 simultaneously. The current-voltage curves 10 of modules 7.1, 7.2, 7.3 differ mainly in the range close to the respective closed-circuit current $ICC_1$, $ICC_2$, $ICC_3$ per module 7.1, 7.2, 7.3. A stack current target value $I_{S,set}$ close to the open-circuit currents $ICC_1$, $ICC_2$, $ICC_3$ is shown as an example. Due to the differences, especially in the very flat slope range in the current-voltage curves 10, the stack current target value $I_{S,set}$ results in three very different module voltages $U_{M,7.1}$, $U_{M,7.2}$, $U_{M,7.3}$ for the modules 7.1, 7.2, 7.3. This shows that the individual modules 7.1. 7.2, 7.3 have different behaviors in the form of different current-voltage curves 10 with the same stack current IS.

As shown in FIG. 1b, the modules 7.1, 7.2 and 7.3 each comprise an MLSD unit M which monitors the module voltage $U_M$ of the assigned module. The MLSD units M can both switch on and shut down modules 7.1, 7.2 and 7.3. Therefore, such a shutdown and switching on has an effect on the MPP scan.

MLSD units M cause a shutdown of a module 7.1, 7.2, 7.3 as soon as the module voltage $U_M$ of the respective module falls below a first module voltage threshold value $U_{M,G.1}$, which can be 8 VDC (volt DC voltage), for example. The inverter 2 has no influence on such a shutdown. While, in the example according to FIG. 2, the module voltages $U_{M,7.2}$ and $U_{M,7.1}$ are above this first module voltage threshold value $U_{M,G.1}$ at the stack current target value $I_{S,set}$ shown, the module voltage $U_{M,7.3}$ is already below it, such that the MLSD unit M of the module 7.3 has shut down the module 7.3. The MLSD unit M is preferably mounted on each module 7.i, such that each module 7.i can also be shut down or switched on individually. Communication with the inverter 2 is preferably done by a power line communication (PLC) signal via the lines 6. As mentioned above, the current-voltage curves 10 depend on several factors during operation. Consequently, in a subsequent MPP scan—in which the stack current $I_S$ and/or the stack voltage $U_S$ are changed as electrical parameters Pi—another module 7.i, different from the third module 7.3 in the example, can also fall below the first module voltage threshold value $U_{M,G.1}$.

FIG. 3 shows as an example the corresponding voltage-power curve 11 of the modules 7.1, 7.2, 7.3, for example arranged in the string $S_1$ as shown in FIG. 1b. The module voltage $U_M$ is plotted on the abscissa, while the module power $P_M$ is plotted on the ordinate. The maximum stack power $P_S$ of the entire solar cell stack 3 is in a maximum range 12 close to the open-circuit voltage $U_{oc}$ and correspondingly above the first module voltage threshold value $U_{M,G.1}$. Advantageously, an overall voltage-power curve of the solar cell stack 3 can be calculated using the individual voltage-power curve 11 of the modules 7.i. The MPP scan is based on the variation of the stack current $I_S$ and/or the stack voltage $U_S$ of the solar cell stack 3 and is used to determine an optimum maximum power point MPP in the maximum range 12 of the voltage-power curves 11 of the solar cell stack 3 (not shown). Upon an MPP scan, the maximum power point MPP is moved on the voltage-power curve 11 by varying the stack current $I_S$ and/or the stack voltage $U_S$. If the voltage falls below a first module voltage threshold value $U_{M,G.1}$, the corresponding module 7.i is shut down by the corresponding MLSD unit M.

FIG. 4 shows the course of an MPP scan for the described modules 7.1, 7.2. 7.3 of the solar cell stack 3, as it is carried out, for example, in the prior art. The time t is plotted on the abscissa and the stack current target value $I_{S,set}$, the module voltages $U_M$ of the individual modules 7.i and the stack power $P_S$ are plotted on the ordinate. Before the MPP scan, the inverter 2 specifies a maximum power point MPP (determined in a previous MPP scan, for example) in the range 13, in which the solar cell stack 3 has a determined stack current $I_S$ and a determined stack voltage $U_S$. In the range 13, all modules 7.1, 7.2, 7.3 are active and contribute to the stack power $P_S$ of solar cell stack 3. At a maximum power point MPP, individual modules 7.i can also be inactive, if this maximizes the stack power $P_S$ in this cycle. For example, a module 7.i can be shaded and is therefore inactive in this cycle—i.e., shut down by the MLSD unit M, for example. It is also possible that a module 7.i is defective and is therefore permanently deactivated. To illustrate this, all three modules 7.1, 7.2, 7.3 are active in the range 13 in FIG. 4. The range 13 is followed by a variation range 14, in which the MPP scan takes place. The module voltages $U_M$ are slightly different in the range 13, as can be seen on the basis of the current-voltage curves 10 in FIG. 2. The sum of the individual module voltages $U_M$ then results in a stack voltage $U_S$ (not shown here).

To carry out the MPP scan, an established electrical control parameter Pi of the solar cell stack 3 is varied, wherein the stack current $I_S$ is used as the control parameter Pi in FIG. 4, for example. The stack current $I_S$ is varied, i.e., galvanostatically controlled to a defined stack current target value $I_{S,set}$. However, a control via a stack voltage $U_S$ as the electrical control parameter Pi is also possible, i.e., potentiostatic control to a defined stack voltage target value $U_{S,Set}$. The stack current target value $I_{S,set}$ is first increased in the variation range 14 by a first predefined ramp 16. The stack current target value $I_{S,set}$ can be increased in the first ramp 16, for example, until the generally decreasing module voltages $U_M$ (or also the calculated or measured stack voltage $U_S$) has fallen to half its value starting from the determined value as the reference value of the stack voltage $U_S$ in the range 13. The current value reached at this point in time forms a parameter threshold value g1. Since a plurality of modules 7.1, 7.2. 7.3 are connected in series in the solar cell stack 3, the same stack current target value $I_{S,Set}$ flows through all modules 7.1, 7.2, 7.2. However, the module voltage $U_M$ can be different for each module 7.1, 7.2, 7.3, as shown in the voltage curve in FIG. 4. The parameter threshold value g1 can also be determined in another way or can also be specified as a threshold value of the electrical control parameter Pi established before the MPP scans.

For example, the module voltages $U_M$ of the modules 7.1, 7.2 can drop to half the value of the module voltages $U_M$ (determined from the range 13) in the range 14, which can still be above the first module voltage threshold values $U_{M,G,1}$ of the MLSD units M in standard operation. The third module 7.3 falls below the first module voltage threshold value $U_{M,G,1}$ (as can also be seen in FIG. 2) and is shut down at point in time x by the associated MLSD unit M. This can happen, for example, due to soiling or shading of the third module 7.3, as described above. Accordingly, upon the shutdown of the third module 7.3, a loss of stack power $P_S$ also results, as can be seen at point in time x. The abrupt reduction in the stack power $P_S$ is shown at point in time x upon the shutdown of the third module 7.3.

After reaching the parameter threshold value g1 of the stack current target value $I_{S,set}$, the stack current target value $I_{S,set}$ is reduced again in the variation range 14 by a second predefined ramp 17. The stack current target value $I_{S,set}$ can thus be reduced to up to half the value of the stack current target value $I_{S,set}$ from the range 13. In general, the stack current $I_S$ can also be controlled to a defined fixed value (reduced in the second predefined ramp 17). The stack power $P_S$ increases again and substantially reaches its maximum range 12 prior to reaching the end value of the ramp 17 of the stack current target value $I_{S,set}$, in which the maximum power point MPP is located and is determined in this maximum range 12.

As can be seen in FIG. 4, the third module 7.3 is not active during the entire MPP scan, such that the third module 7.3 is not taken into account when determining the stack power $P_S$ in the maximum range 12 of the variation range 14 (also shown in FIG. 3). Therefore, the maximum power point MPP is set at the point in time y, at which the maximum stack power $P_S$ results—that maximum stack power $P_S$ is correspondingly lower than in the range 13 due to the missing module 7.3, which is shown by the power difference $\Delta P$. The power difference $\Delta P$ is a function of the number of active modules (7.1, 7.2) and inactive modules (7.3) and can therefore assume positive or negative values of the stack power $P_S$. Only one peak or hill is shown in FIG. 4, such that this peak represents the current maximum power point MPP. If the MPP scan results in a plurality of peaks in the maximum range 12, the highest peak is used as the maximum power point MPP in the prior art. However, as can be seen in FIG. 4, this leads to disadvantages in the determination of the maximum power point MPP, as not all modules 7.i are switched on here (module 7.3 is inactive in the example), which are therefore not taken into account. A peak or hill can be determined, for example, via the first derivative of the stack power $P_S$ over the time t.

After the shutdown of the third module 7.3 at point in time x, it takes a certain amount of time (for example, a few seconds) until the module voltage $U_{M,7.3}$ of the third module 7.3 exceeds a second module voltage threshold value $U_{M,G,2}$ at point in time z, at which point the third module 7.3 is switched on again. The increase in the module voltage $U_{M,7.3}$ of the third module 7.3 is due to the fact that the stack current target value $I_{S,set}$ in the variation range 14 is reduced at the ramp 17, as a result of which the module voltage $U_M$ increases due to the correlation of the current-voltage curve (FIG. 2). This switching on can also be a function of a PLC signal from the inverter 2 (or a control unit integrated in the inverter), which may lead to a further delay in switching on under certain circumstances. Switching on the third module 7.3 outside the variation range 14 has no influence on the MPP scan and the determination of the maximum power point MPP, even if there is a power peak 18 at point in time z. However, the third module 7.3 is not taken into account in the calculation of the maximum power point MPP.

The variation range 14 is followed by a so-called MPP tracking range 15, in which the current maximum power point MPP (in the maximum range 12 previously determined by the MPP scan) is set and the solar cell stack 3 is controlled on the basis of this current maximum power point MPP until the next MPP scan is carried out. The predefined ramps 16, 17, as shown in FIG. 4, are only exemplary and can also be designed differently, being therefore not necessarily symmetrical. The slope of the ramps 16, 17 can also be selected so that they represent a step or jump. Advantageously, an MPP scan can be carried out not only for an individual solar cell stack 3, but also for a plurality of solar cell stacks 3. It is particularly advantageous for all solar cell stacks 3 to be scanned simultaneously by the inverter 2 using MPP scans, to determine in each case a maximum power point MPP of each solar cell stack 3 simultaneously and independently.

It is also possible, for example, that the MPP scan is initialized at a defined starting value of an electrical parameter Pi, which deviates from the last specified maximum power point MPP in the range 13. Depending on the design of an MPP scan, it can also happen that previously deactivated modules 7.i are deactivated at the beginning of the MPP scan and only switch on later. Advantageously, the MPP scan and an MPP tracking alternate periodically during the operation of the solar cell stack 3. However, MPP tracking is active over a longer period of time, for example 10-30 minutes, while an MPP scan may take only a few seconds to minutes. The problems described above with the MPP scan, i.e., that individual modules 7.*i* are not active upon the determination of the maximum power point MPP due to the shutdown by the MLSD units M, are solved by the method according to the invention, which is explained in more detail below with reference to FIG. 5.

FIG. 5 shows an exemplary embodiment of the MPP scan according to the invention. The time tis plotted on the abscissa, while the stack current $I_S$, stack voltage $U_S$ and stack power $P_S$ are plotted on the ordinate. As already mentioned, both the stack current $I_S$ and the stack voltage $U_S$ can be used as the electrical control parameter Pi for the MPP scan according to the invention. As mentioned above, the stack voltage $U_S$ is the sum of all module voltages $U_M$ of the modules 7.*i* of the solar cell stack 3. To make the method easier to understand, the individual module voltages $U_M$ are not plotted in FIG. 5 and only the (total) stack voltage $U_S$ is shown.

It is also possible to change the electrical control parameters Pi (i.e., voltage or current as the target value) during the MPP scan, to switch between control via the stack current $I_S$ and via the stack voltage $U_S$, for example, which is also explained in more detail below using the exemplary embodiment in FIG. 5. It is also possible that the stack power $P_S$ is used as the electrical parameter Pi for control.

The maximum power point MPP of the previous cycle with a determined stack current target value $I_{S,set}$ and a determined stack voltage $U_S$ is still predefined in each case in the range 13. In a first step, the electrical control parameter Pi is changed to a predefined first wait value x1 at the beginning of the first time period z1. If the stack current $I_S$ is used as the control parameter Pi, the change can be carried out, for example, by reducing the stack current target value $I_{S,set}$. If the stack voltage $U_S$ is used as the control parameter Pi, the change can be carried out, for example, by increasing the stack voltage target value $U_{S,Set}$. The the stack current $I_S$ is reduced, for example, to half the value of the stack current $I_S$, which was applied in the range 13. If an MPP scan has already been carried out before the range 13, this can be the value of the previously determined maximum power point MPP. However, it is also possible that the first wait value x1 is predefined as a fixed value.

With a stack voltage $U_S$ as the control parameter Pi, the stack voltage target value $U_{S,set}$ (not shown here in the time period z1) can accordingly be reduced to half the value of the stack voltage $U_S$ from the range 13, or also to a predefined fixed value. After changing the control parameter Pi to the first wait value x1, the electrical control parameter Pi is kept at the wait value x1 for a first time period z1. The reduction of the stack current target value $I_{S,set}$ to the wait value x1 results in the stack voltage $U_S$ being set on the basis of the current-voltage curve 10, i.e., it increases. The increased stack voltage $U_S$ causes the second module voltage threshold value $U_{M,G.2}$ of the plurality of modules 7 to be exceeded. According to the invention, this ensures that all deactivated modules 7.*i* are switched on via the MLSD units M in this first time period z1, as can be seen at point in time zz. By switching on the module 7.*i*, the displayed stack voltage $U_S$ and stack power $P_S$ are increased by leaps and bounds.

The second module voltage threshold value $U_{M,G.2}$ is therefore relevant for switching on the modules 7.*i* by the associated MLSD unit M and the first module voltage threshold value $U_{M,G.1}$ for the shutdown of the modules 7.*i*. Accordingly, the second module voltage threshold value $U_{M,G.2}$ can be higher than the first module voltage threshold value $U_{M,G.1}$, so that a module 7.1 only shuts down at a relatively low module voltage $U_M$, i.e., is shut down as late as possible. The second module voltage threshold value $U_{M,G.2}$ is designed to ensure that the stack voltage $U_S$ is sufficiently high for a longer active phase during operation upon switching on the module 7.1 via the MLSD unit M. However, it is also possible that the second module voltage threshold value $U_{M,G.2}$ and the first module voltage threshold value $U_{M,G.1}$ are the same. Of course, there may also be permanently inactive modules 7.*i* that are defective. Therefore, these cannot be switched on in the first time period z1.

Advantageously, the first time period z1 is automatically terminated by a timeout, for example after one second. However, it is also possible that the first time period z1 is only ended when all modules 7.*i* that can be activated are also active. This can be controlled via a PLC signal from the inverter 2, for example. The inverter 2 can then, for example, terminate the first time period z1 depending on the PLC signal transmitted. Thus, for example, a PLC signal can be transmitted every second, wherein the time period z1 after the PLC signal terminates, as soon as all modules 7.1 are active. Thus, the first time period z1 can last longer than one second.

After the first time period z1, the MPP scan starts in the variation range 14. For this purpose, the electrical control parameter Pi is changed in the variation range 14 to the specified parameter threshold value g1 by the inverter 2, (which can, for example, be half the value from the range 13, as explained in FIG. 4). If the stack current $I_S$ is used as the electrical control parameter Pi, the stack current target value $I_{S,Set}$ is then increased. If the stack voltage $U_S$ is used as the electrical control parameter Pi, the stack voltage target value $U_{S,Set}$ is then reduced. The electrical control parameter Pi can, for example, be designed as a linear ramp as shown in FIG. 5, but other curves that the person skilled in the art considers suitable are also possible. It may also be possible to change the electrical control parameter Pi in stages, for example.

The parameter threshold value g1 can, for example, be close to the closed-circuit current $I_{cc}$. For example, it may also be possible to define the parameter threshold value g1 as a fixed value, which is defined by the person skilled in the art, for example. The fixed value can be half the maximum permissible voltage on a module 7.*i*, for example. Advantageously, a maximum power point MPP determined in a previous MPP scan can also be used as the reference value. The parameter threshold value g1 can be represented as half the reference value. Thus, the parameter threshold value g1 can be half the value of the stack voltage $U_S$ from the range 13. It is also possible that an MPP scan under test conditions (for example, after production without shading 9.1 or soiling 9.2) is used as the reference value. Thus, the parameter threshold value g1 can be adjusted to the respective reference value.

As shown in FIG. 5, the stack current target value $I_{S,Set}$ is thus increased in the variation range 14, for example until the stack voltage $U_S$ has reached half its value from the range 13. The increasing stack current target value $I_{S,Set}$ causes the stack voltage $U_S$ to decrease according to the current-voltage curve 10 in FIG. 2. As a function of the individual current-voltage curves 10 of the modules 7.*i*, the modules 7.1 may fall below the first module voltage threshold value $U_{M,G.1}$ at different points in time, such that the MLSD units M in the modules 7.*i* shut down at different points in time. This is illustrated by the abrupt changes in the stack voltage $U_S$ and the stack power $P_S$ at the end of the variation range 14.

Contrary to the prior art, the maximum power point MPP is determined in the method according to the invention in the first part of the variation range 14 of the increasing stack current target value $I_{S,Set}$, since the stack voltage $U_S$ (or the module voltages $U_M$) is still high here according to the current-voltage curve 10 in FIG. 2 and thus the maximum power point MPP is in the maximum range 12, which is also shown in FIG. 5. Thus, the maximum power point MPP is determined at the peak or maximum stack power $P_S$. Thus, the maximum stack power $P_S$ of the solar cell stack 3 is initially determined from the current-voltage curves 10 determined in the variation range 14 and this maximum stack power $P_S$ is thereafter predefined to the solar cell stack 3 (by the inverter 2) as the new maximum power point MPP in the subsequent MPP tracking range 15. The duration of the variation range 14 is selected so that ideally no or as few modules 7.*i* as possible are shut down by their respective MLSD unit M during the MPP scan. Of course, this may also depend on the selected parameter threshold value g1. The closer the parameter threshold value g1 is selected to the closed-circuit current $I_{CC}$ of the individual modules 7.*i*, the more modules 7.*i* will shut down during the variation range 14. Advantageously, the time period of the variation range 14 can be adjusted with each MPP scan.

The method according to the invention changes the electrical control parameter Pi in the variation range 14 in such a way that the current-voltage curve 10 in accordance with FIG. 2 is scanned from the open-circuit voltage $U_{OC}$ in the direction of the closed-circuit current $I_{CC}$. In the exemplary embodiment in FIG. 5, a low stack current $I_S$ and a high stack voltage $U_S$ are therefore used to start. In principle, however, the MPP scan could also be carried out in the opposite direction from the closed-circuit current $I_{CC}$ in the direction of the open-circuit voltage $U_{OC}$. Accordingly (as already mentioned), the maximum range 12, which is important for the maximum power point MPP, is determined in a first phase of the variation range 14, since the maximum stack power $P_S$ can also be found in this maximum range 12, as shown in FIG. 5 by way of example in the temporal course of the stack power $P_S$. Given that all available modules 7.*i* (except the defective ones) are active in this variation range 14, the maximum power point MPP can be reliably determined in comparison to the prior art. This is due to the fact that in the time period z1 before the MPP scan, it is ensured that all modules 7.1 are switched on via their MLSD units M.

The determination of the maximum power point MPP can be determined using an extreme value task, such that the peak or maximum is found. The voltage-power curves 11 can be calculated in simple form via the current-voltage curves 10. The maximum power point MPP of the solar cell stack 3 determined in this way is then used for the second time period z2 following the variation range 14.

In the second time period z2, the electrical control parameter Pi is set to a predefined second wait value x2 by the inverter 2. In an exemplary embodiment in FIG. 5, the electrical control parameter Pi is also changed from stack current $I_S$ to stack voltage $U_S$. This means that the stack voltage target value $U_{S,Set}$ is increased (abruptly) to at least the stack voltage US of the previously determined maximum power point MPP, as a result of which the stack current $I_S$ is reduced (abruptly) according to the current-voltage curves 10 in accordance with FIG. 2. The wait value x2 is retained for a specified time period, for example 1 second. This ensures that all modules 7.*i* are switched on again via their MLSD unit M, which have shut down in the variation range 14 because the stack voltage $U_{S,Set}$ is above the second module voltage threshold value $U_{M,G,2}$ in the second time period z2 (not shown here). As can be seen at the end of the second time period z2, the modules 7.*i* are switched on via the MLSD units M and the stack current $I_S$ increases accordingly.

If the stack current target value $I_{S,Set}$ is maintained as the control parameter Pi in the second time range z2, it may be necessary to readjust the stack voltage $U_S$ upon switching on the individual modules 7.*i*, to ensure that the stack voltage $U_S$ remains above the second module voltage threshold value $U_{M,G,2}$. It can then be assumed that after a certain time, e.g., determined or set by the inverter 2, after transmitting the PLC signal and/or after increasing the stack voltage $U_S$, as shown in FIG. 5 in time period z2, the module voltages $U_M$ are above the second module voltage threshold value $U_{M,G,2}$ and thus all activatable MLSD units M have switched on the modules 7.*i*.

The second time period z2 is followed by an MPP tracking range 15, in which the newly determined maximum power point MPP with stack voltage $U_S$ and stack current $I_S$ is predefined and the solar cell stack 3 is operated at this power point MPP until the next MPP scan. To achieve this, the previously increased stack voltage $U_S$ of the maximum power point MPP is reduced again and the stack current $I_S$ is set corresponding to the current-voltage curve 10. This enables easy adaptation of the maximum power point MPP, which can change during operation due to environmental conditions.

An MPP scan is performed as described above to ensure that the maximum power point MPP corresponds to a maximum (i.e., on the highest peak/hill as shown in FIG. 4 and FIG. 5 in the stack power $P_S$ diagram). An MPP tracker in the MPP tracking range 15 changes the maximum power point MPP only slightly on the current-voltage curve 10 or current-power curve 11 and therefore constantly controls at the current maximum, i.e. the peak. Therefore, an MPP tracker in the MPP tracking range 15 is not designed to find a maximum like the MPP scan.

In an advantageous embodiment, the MPP scan according to the invention is also linked to a PLC signal. The PLC signal is a signal, usually of high frequency, which is transmitted to the MLSD units M at regular points in time and which causes the switching on of deactivated modules 7.*i* via the respective MLSD unit M. For example, the PLC signal is transmitted from an inverter 2 to the MLSD units M via the lines 6. Advantageously, this PLC signal is transmitted at millisecond to second intervals. To keep the time periods z1. z2 as short as possible and thus also reduce the duration of the entire MPP scan, the PLC signal can be synchronized with the first time period z1 and/or the second time period z2. This ensures that the modules 7.*i* are started immediately, when the second module voltage threshold value $U_{M,G,2}$ is exceeded and the time period z1 and/or z2 is ended accordingly. Thus, the respective time period is optimized for the switching on of the modules 7.*i*. However, this can also be done by automatically determining the times by measuring the time periods during the current MPP scan and adjusting them accordingly on the subsequent MPP scan.

In an advantageous embodiment, the first time period z1 and the second time period z2 are also of the same duration. It is possible to link both time periods z1, z2 to a PLC signal and/or to the switching on of all activatable modules 7.*i* in the time periods z1 and z2. However, depending on the maximum power point MPP, the number of switched-on modules 7.i can also differ between the first time period z1 and the second time period z2.

In an advantageous embodiment, MPP tracking is carried out in each case between successive MPP scans, to control the maximum power point MPP.

FIG. 6 schematically shows the time sequence, wherein an MPP tracking 19 is carried out between successive MPP scans 20. Before a new maximum power point MPP is determined (by the MPP scan 20), the MPP tracking 19 runs and varies the electrical control parameter Pi in a smaller defined control parameter range ΔPi (substantially in the maximum range 12) relative to the control range of the MPP scan 20, i.e., only in the range of the first maximum power point MPP.1 found by the MPP scan 20 (not shown) carried out before the first MPP tracking 19 shown. For example, the control parameter range ΔPi can be a few percent of the value of the maximum power point MPP, such as +/−5%. As a result, there is no interruption in power generation as with the MPP scan 20.

Compared to the MPP scan 20, the MPP tracking 19 can therefore run for much longer, as shown in the interrupted time axis t. Accordingly, the ratios between the MPP scan 20 and the MPP tracking 19 in FIG. 6 are not shown realistically in terms of the duration of each phase. A phase with the MPP tracking 19 is followed by a much shorter MPP scan 20 according to the invention, which determines a new maximum power point MPP.2 of the solar cell stack 3, which replaces the previously determined maximum power point MPP.1. The MPP tracking 19 varies by the smaller control parameter range ΔPi at the current maximum power point MPP.2, until a new MPP scan 20 is started. Thus, the MPP scan 20 according to the invention can be used to ensure that the maximum power point MPP.x has been determined with all available active modules and that the MPP tracking 19 accordingly optimally controls the power of the solar cell stack 3 over the operating duration. Of course, the maximum power points MPP.1, MPP.2, MPP.x are not always the same, since, as described above, shading 9.2 and/or soiling 9.1 can always lead to changes in the stack power $P_S$.

The invention claimed is:

1. A method for optimizing a maximum power point of a solar cell stack comprising a plurality of modules and an inverter, each module of the plurality of modules comprising an MLSD unit, which shuts down the connected module as soon as a module voltage of the respective module falls below a first module voltage threshold value, and which switches the connected module on, when a predefined second module voltage threshold value is exceeded, the method comprising:
    defining an electrical control parameter;
    changing the electrical control parameter to a predefined first wait value with the inverter, the first wait value being determined such that the second module voltage threshold value of the plurality of modules is exceeded;
    keeping the electrical control parameter at the first wait value for a predefined first time period, such that the plurality of modules is switched on by the MLSD units
    changing the electrical control parameter to a parameter threshold value in a variation range with the help pf the inverter and determining current-voltage curves for the plurality of modules in the variation range;
    determining a maximum stack power of the solar cell stack from the current-voltage curves of the plurality of modules determined in the variation range;
    predefining the determined maximum stack power in the solar cell stack as the maximum power point.

2. The method according to claim 1, wherein, after determining the maximum power point, the method further comprises:
    changing the electrical control parameter to a predefined second wait value with the inverter, the second wait value being determined such that the second module voltage threshold value of the plurality of modules is exceeded;
    keeping the electrical control parameter at the second wait value for a predefined second time period, such that the plurality of modules is switched on by the MLSD units.

3. The method according to claim 2, wherein the first time period and the second time period are of equal length.

4. The method according to claim 1, wherein a stack current is used as the electrical control parameter, an established stack current target value being used as the first wait value and the stack current target value being increased from the first wait value to the parameter threshold value.

5. The method according to claim 1, wherein a stack voltage is used as the electrical control parameter, an established stack voltage target value being used as the first wait value and the stack voltage being reduced from the first wait value to the parameter threshold value.

6. The method according to claim 1, wherein a different electrical control parameter is used in the second time period than in the first time period.

7. The method according to claim 1, wherein the first time period is defined via a predefined time period or as a function of a PLC signal transmitted from the inverter to the MLSD units or by the point in time, at which a module is switched on in the solar cell stack and/or in that the second time period is defined via a predefined time period or as a function of a PLC signal transmitted from the inverter to the MLSD units.

8. The method according to claim 1, wherein the parameter threshold value is established as a function of a predefined fixed value or a reference value.

9. The method according to claim 8, wherein a value is used as the reference value of the parameter threshold value, at which value the stack voltage corresponds to 30-60%, preferably 50%, of the stack voltage from a range prior to the MPP scan.

10. The method according to claim 1, wherein an MPP tracking is carried out after the determination of the maximum power point, in which MPP tracking the determined maximum power point is changed within a defined control parameter range, wherein the control parameter range preferably is ±10% of the determined maximum power point.

11. The apparatus according to claim 1, wherein a maximum power point is predefined for a plurality of solar cell stacks via the inverter.

12. An apparatus for optimizing a maximum power point of a solar cell stack, wherein the solar cell stack comprises a plurality of modules, wherein each module of the plurality of modules comprises an MLSD unit, being designed to shut down the connected module as soon as a module voltage of the respective module falls below a first module voltage threshold value, and to switch the connected module on, when a second module voltage threshold value is exceeded, wherein an inverter is provided, which is designed to carry out the following-steps on the solar cell stack:
    defining an electrical control parameter;
    changing the electrical control parameter to an assigned first wait value with the inverter, wherein the first wait value is established such that the second module voltage threshold value of the plurality of modules is exceeded;

keeping the electrical control parameter at the first wait value for a first time period such that the plurality of modules is switched on by the MLSD units;

changing the electrical control parameter to a parameter threshold value in a variation range with the inverter and determining the current-voltage curves of the plurality of modules in the variation range;

determining a maximum stack power of the solar cell stack from the current-voltage curves of the plurality of modules determined in the variation range;

predefining the determined maximum stack power in the solar cell stack as the maximum power point.

13. The apparatus according to claim 12, wherein, after determining the maximum power point, the inverter further carries out:

changing the electrical control parameter to a second wait value with the inverter, the second wait value being established such that the second module voltage threshold value of the plurality of modules is exceeded;

keeping the electrical control parameter at the second wait value for a second time period such that the plurality of modules is switched on by the MLSD units.

14. The apparatus according to claim 1, wherein the inverter comprises a control unit, wherein the inverter is designed to transmit a PLC signal to the solar cell stack.

* * * * *